Sept. 10, 1935.   M. J. JOHNSON   2,014,194
MAGNETIC CONTROL DEVICE
Filed Aug. 28, 1928
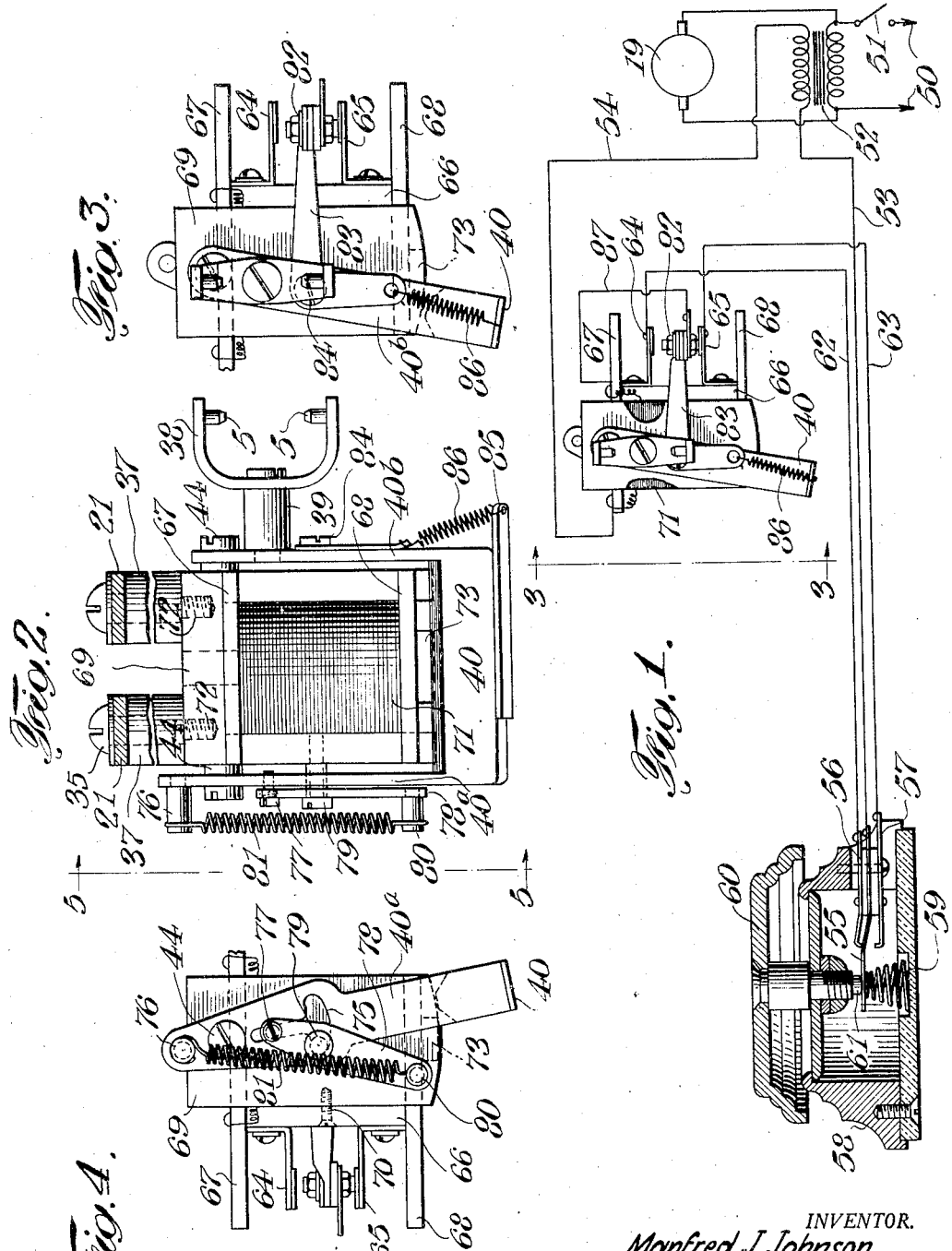
INVENTOR.
Manfred J. Johnson.
BY
Emery, Booth, Janney & Varney
ATTORNEYS.

Patented Sept. 10, 1935

2,014,194

UNITED STATES PATENT OFFICE 2,014,194

MAGNETIC CONTROL DEVICE

Manfred J. Johnson, Bridgeport, Conn.

Application August 28, 1928, Serial No. 302,475

2 Claims. (Cl. 200—87)

This invention relates generally to clutch-actuating means, and more particularly to magnetic control devices therefor. It is an object of the invention to provide a quick acting control device of the nature described. A further object is to provide a simple and reliable magnetic control mechanism of the nature described.

Other objects and advantages of this invention will appear hereinafter.

A preferred embodiment of the invention selected for purposes of illustration is disclosed in the accompanying drawing, in which,—

Fig. 1 is a partially diagrammatic showing of an electro-magnet control mechanism, the operator's remote control means, and the source of operating power;

Fig. 2 is a front view to an enlarged scale of the electro-magnet control mechanism taken in the direction indicated by the line 3—3 of Fig. 1;

Fig. 3 is a side view of the electro-magnet control mechanism to the same scale as Fig. 2; and Fig. 4 is a side view of the electro-magnet control mechanism taken in the direction indicated by line 5—5 of Fig. 2.

Referring to the drawing, there is shown a shiftable yoke 38, which may be used to shift the movable member of a clutch or other like mechanism (not shown). The yoke 38 is pivotally mounted on a post 39 carried by the arm 40b of a U-shaped bail 40. The bail 40, having the arms 40a and 40b, is pivotally mounted, by means of the screws 44, on a member 69.

This member 69, which supports the clutch actuating mechanism, is suspended from a plate 21 by means of the screws 35 which, (as best shown in Fig. 2) engage the threaded openings 72 in the member 69, and the member 69 is spaced from the plate 21 by means of the spacing collars 37. The clutch or other mechanism may be moved by the shifting of the yoke-carrying bail 40 about its pivots 44, and, as will appear hereinafter, the bail 40 preferably is associated with the armature of a single electro-magnet in such a manner that the repeated energization of the electro-magnet operates to shift the bail from one position to the other under the control of the operator.

As shown in Figs. 2 to 4, the member 69 preferably is an inverted U-shaped piece, which, with the central core member 73 carrying the magnet coil 71, comprises an electro-magnet for actuating the clutch shifting mechanism. The coil 71 may be held in place on the central core member 73 by suitable means such as the insulating members 67 and 68.

The bail member 40 preferably has limited turning movement, and suitable means, such as a toggle spring arrangement, for normally maintaining the bail 40 in whichever of its two extreme positions it may happen to occupy. As shown in Figs. 2 and 4, the arm 40a of the bail is provided with a substantially inverted T-shaped slot 75. The vertical part of the T-shaped slot points toward the pivot 44, and the transverse part of the T-shaped slot is arcuate with respect to the said pivot 44. Passing through the arcuate portion of the slot 75 is a stud 79, which is fixed upon one of the depending legs of the member 69. The arcuate slot 75 and the stud 79 limit the turning of the bail 40 about the pivot 44.

Pivotally mounted on the outer end of the stud 79 is a lever 78, the upper end of which carries an inwardly projecting pin 77 slidably engaging the vertical portion of the T-shaped slot 75. The lower end of the lever 78 carries an outwardly projecting stud 80, to which is attached one end of a tension spring 81. The other end of this spring is fastened to the outer end of a stud 76 mounted on a portion of the bail arm 40a extending beyond the pivot 44.

It will be seen that this arrangement provides a toggle control which acts through the spring 81 and the pivoted lever 78 to snap the bail 40 to one or the other of its extreme positions as soon as the bail is moved sufficiently to carry the spring 81 over the center of the stud 79.

The lower portion of the U-shaped bail 40 serves as an armature for cooperating with the central core member 73 and the legs of the U-shaped piece 69, substantially to complete a branched, closed magnetic circuit through the central core member 73 and the legs of the U-shaped piece 69. When the electro-magnet coil 71 is energized, the armature 40 will move from either of the positions to which it is normally biased by means of the spring toggle arrangement, to a position in line with the core 73 and the ends of the legs of the U-shaped piece 69. With the armature in this position the spring 81 theoretically will extend over the center of the stud 79. However, when the electro-magnet is energized, the momentum of the suddenly shifted armature will move the bail actually to carry the spring slightly past the center of the stud 79, but the continued energization of the electro-magnet will cause the armature to come to rest with the spring 81 over the center of the stud 79.

It will be seen, therefore, that if some means is provided to break the energizing circuit of the electro-magnet at the instant the spring 81 first passes over the center of the stud 79, the spring 81 will act to continue the movement of the bail, and the act of energizing the electro-magnet will result in a shifting of the armature and bail 40 from one of its extreme positions to the other.

As best seen in Fig. 3, the means for breaking the circuit of the electro-magnet comprises a double throw switch having fixedly mounted contacts 64 and 65, and an intermediate contact 82 which may be moved into engagement with either of the contacts 64 and 65. The contacts 64 and 65 are mounted upon a piece of insulating material 66, which may be secured to the core 69, (as by means of the screws 70 shown in Fig. 4). The contact 82 is mounted on one end of a switch arm 83, and preferably is insulated therefrom in any suitable manner. As shown, the switch arm 83 comprises a substantially right-angled bell crank which is pivotally mounted on the bail arm 40b at 84. The other end of the switch arm 83 is connected by means of a spiral spring 86 to the bail 40 at 85.

When the bail 40 is in the position shown in Figs. 1 and 3, the spring 86 biases the switch arm 83 to bring the contacts 65 and 82 together. When the bail 40 is in its other extreme position the spring 86 will bias the switch arm 83 to bring the contacts 64 and 82 together.

In Fig. 1, which is a partially diagrammatic showing of an illustrative embodiment of the complete control mechanism, the mandrel driving motor 19 is supplied with power from a source of electricity, (not shown) by means of the leads indicated diagrammatically at 50. Ordinarily this connection will be made through a lighting circuit outlet. A switch 51 is inserted, preferably in the circuit between the motor 19 and the leads 50, so that operation of the motor may be conveniently controlled. Power also is supplied from the leads 50 to the electric clutch mechanism, and, as shown, a transformer 52, having the leads 53 and 54 connected to the secondary terminals thereof, supplies this power at any suitable voltage.

The leads 53 and 54 connect with the electro-magnet device for actuating the yoke-carrying bail 40, and also with a suitable operator's foot control switch shown at the left of Fig. 1, for controlling the operation of said electro-magnet device. As shown, the lead 53 connects with a spring switch terminal 55, which is mounted between, and insulated from two other spring switch terminals 56 and 57, all mounted in any suitable supporting member such as 58. Terminals 55 and 56 normally are maintained in contact with each other by means of a spring 59. A button 60 is movably mounted on the supporting member 58, and has a projection 61 bearing on the switch terminal 55 in such a manner as to limit the movement thereof by the spring 59. The button 60 is adapted to be moved against the pressure of the spring 59 by the exertion of a counter-pressure thereon, as by use of the operator's foot or hand, so as to compress the spring 59, break the electrical contact between the terminals 55 and 56, and complete an electrical circuit through the terminals 55 and 57.

The terminal 56 is connected by means of a lead 62 to the fixed contact 64 of the double throw switch hereinbefore described, and the terminal 57 is connected by means of a lead 63 to the other fixed terminal 65 of this double throw switch. The movable contact 82 is connected by the lead 87 to one terminal of the coil 71, and the other terminal of the coil 71 connects to the lead 54.

The operation of the arrangement is as follows: With the bail 40 in the position shown in Figs. 1 and 3, the clutch is disengaged and the shafts 33 and 25 are disconnected. The spring 86 biases the switch arm 83 to maintain contact between 65 and 82, and the electrical circuit through the coil 71 is open. When the operator actuates the button 60, an electrical circuit is completed from the transformer 52 through the lead 53, contacts 55 and 57, lead 63, contacts 65 and 82, lead 87, the electromagnet coil 71, and lead 54 back to the transformer 52. Passage of current through the coil 71 causes the armature 40 to be moved toward a point directly under the end of the central core member 73. The momentum of the armature and bail 40 carries the armature past the end of the core member 73, whereupon the spring 86 biases the switch arm 83 to break the engagement between the contacts 65 and 82, thereby opening the electrical circuit through the electro-magnet 71. When the electro-magnet is de-energized in this manner, the spring 81 causes the continued movement of the bail 40, and biases the bail 40 to the opposite extreme position from that shown in Fig. 1. This movement of the bail 40 shifts the yoke 38 and, with it, the mechanism to which it is connected.

When the bail 40 is moved to separate the contacts 65 and 82, the spring 86 is made to bias the switch arm 83 so as to bring contacts 64 and 82 together. It is seen therefore, that a circuit is prepared so that the electro-magnet again will be energized as soon as the operator releases the button 60, through the following circuit:—transformer 52, lead 53, contacts 55 and 56, lead 62, contacts 64 and 82, lead 87, coil 71, and lead 54 back to the transformer 52. This operation serves to return the bail 40 to the position shown in Fig. 1, thereby disconnecting the shafts 33 and 25.

Thus it will be seen that when the operator actuates the button 60 by pressure thereon the electro-magnet is momentarily energized to actuate the yoke 38 in one direction, and when the operator releases the button 60, this same electro-magnet is again momentarily energized to actuate the yoke 38 in the opposite direction.

This invention provides a compact clutch operating mechanism which may be readily controlled by means of a single electro-magnet requiring a minimum of power for operation.

It will be understood that the invention may be variously modified and embodied within the scope of the subjoined claims.

I claim:—

1. In a magnetic control device, in combination, rigidly mounted field members, an armature pivotally mounted to swing in opposite directions across the poles of said members, a lever pivotally mounted upon said field members by means of a pin extending through a transverse slot in said armature and having a pin connection with a longitudinal slot in said armature, and a spring connecting said lever with said armature, whereby said armature will be compelled to complete the traverse of its path of movement after having been swung in either direction beyond a predetermined point.

2. In a magnetic control device, in combination, rigidly mounted field members, an armature pivotally mounted to swing in opposite directions across the poles of said members, and a circuit-changing switch comprising contacts mounted in fixed relation to said field members and a contact member adapted to swing from either of said fixed contacts to the other thereof, said contact member being pivotally mounted upon said armature and having an arm adapted to be swung to either side of a dead center position with respect to said armature by a spring connection with said armature for causing operation of said contact member after said armature has passed a predetermined point in traversing its path of movement.

MANFRED J. JOHNSON.